United States Patent [19]

Wieres

[11] Patent Number: 5,501,391
[45] Date of Patent: Mar. 26, 1996

[54] METHOD FOR APPLYING BRAZING MATERIAL TO A METAL STRUCTURE, PARTICULARLY SUBREGIONS OF A HONEYCOMB BODY

[75] Inventor: Ludwig Wieres, Overath, Germany

[73] Assignee: Emitec Gesellschaft fuer Emissionstechnologie mbH, Lohmar, Germany

[21] Appl. No.: 393,856

[22] Filed: Feb. 24, 1995

Related U.S. Application Data

[63] Continuation of PCT/EP93/02303, Aug. 26, 1993

[30] Foreign Application Priority Data

Sep. 18, 1992 [DE] Germany .......................... 42 31 338.4

[51] Int. Cl.$^6$ .......................... B23K 31/02; B23K 1/00; B23K 101/02
[52] U.S. Cl. .................. 228/248.1; 228/181; 228/205; 156/276; 427/261; 427/286
[58] Field of Search ................................. 228/181, 183, 228/205, 232, 248.1, 56.3; 156/276; 427/261, 286, 287

[56] References Cited

U.S. PATENT DOCUMENTS

| | | | |
|---|---|---|---|
| 4,172,547 | 10/1979 | Del Grande | 228/121 |
| 4,256,255 | 3/1981 | Stevenson | 228/181 |
| 4,639,388 | 1/1987 | Ainsworth et al. | 428/117 |
| 4,795,615 | 1/1989 | Cyron et al. | 29/451 |
| 5,050,790 | 9/1991 | Takikawa et al. | 228/181 |
| 5,082,167 | 1/1992 | Sadano et al. | 228/181 |

FOREIGN PATENT DOCUMENTS

| | | |
|---|---|---|
| 0049489 | 4/1982 | European Pat. Off. . |
| 0416758 | 3/1991 | European Pat. Off. . |
| 0469973 | 2/1992 | European Pat. Off. . |
| 0474909 | 3/1992 | European Pat. Off. . |
| 2924592 | 5/1983 | Germany . |
| 3818512 | 12/1989 | Germany . |
| 3603882 | 2/1990 | Germany . |
| 3904743 | 8/1990 | Germany . |

*Primary Examiner*—Samuel M. Heinrich
*Attorney, Agent, or Firm*—Herbert L. Lerner; Laurence A. Greenberg

[57] ABSTRACT

A method for applying brazing material to a metal structure includes applying a sticky material maintaining adhesiveness up to temperatures of at least 180° C. and preferably above 200° C., to at least a subregion of the structure. Then brazing powder is applied which continues to adhere to the sticky material. After the application of the brazing powder but before an actual brazing process, the structure is heat treated without the brazing powder falling out during the heat treatment or during ensuing handling steps. The heat treatment may be a heat-degreasing of the structural parts that do not have or do not yet have brazing material applied to them.

25 Claims, 1 Drawing Sheet

METHOD FOR APPLYING BRAZING MATERIAL TO A METAL STRUCTURE, PARTICULARLY SUBREGIONS OF A HONEYCOMB BODY

CROSS-REFERENCE TO RELATED APPLICATION

This application is a Continuation of International Application Serial No. PCT/EP93/02303, filed Aug. 26, 1993.

BACKGROUND OF THE INVENTION

1. Field of the Invention

The present invention relates to a method for applying brazing material to subregions of a metal structure, particularly a metal honeycomb body. A special application is applying brazing material to the inner surfaces of a jacket tube for a metal honeycomb body, which is used, for instance, as a carrier body for catalytically active material for use in cleaning the exhaust gas of motor vehicles. Other applications with comparably fine sheet-metal structures, such as in heat exchangers, are also possible.

Published European Application No. 0 049 489 B has already disclosed a method for applying brazing material to metal structures, in which a pressure-sensitive adhesive is applied and then is acted upon by brazing powder. That pressure-sensitive adhesive remains adhesive even after drying and is meant to evaporate without residue at the brazing temperature. With the aid of such an adhesive, a thin, practically monoparticulate film can be applied, so that the quantity of brazing material to be applied can be metered quite accurately through the particle size of the brazing material particles being used. That reference makes no further statements about the behavior of the pressure-sensitive adhesive at an elevated temperature, which can occur during heat treatment of the structure.

Various brazing material application methods with their various advantages and disadvantages are known from German Published, Non-Prosecuted Application DE 38 18 512 A1, corresponding to Published International Application WO 89/11938, and corresponding to co-pending U.S. applications Ser. No. 07/621,068, filed Nov. 30, 1990 and Ser. No. 08/054,161, filed Apr. 26, 1993. That reference contains a survey of the brazing methods known at that time for honeycomb bodies and similar structures. Once again, however, nothing is said about the properties of the adhesives or binders being used, at elevated temperature.

It is also known from U.S. Pat. No. 4,795,615, in a metal honeycomb body that has a jacket tube, to perform the binding of the actual honeycomb structure to the jacket tube in a striplike region extending approximately circumferentially, for example by placing a brazing material foil in it. However, such a placement of a brazing material foil is not suitable for all applications, since when a honeycomb structure is thrust into a jacket tube, for instance, a brazing material foil is shifted or displaced.

With more-complex components, such as catalyst carrier bodies or heat exchangers, several production steps are often necessary before the desired body has been completely assembled with brazing material applied to it. The problems that arise will be discussed herein by taking a metal honeycomb body with a jacket tube as an example:

In order to enable the production and processing the fine structures of the sheet metal layers being used for a honeycomb body, it is advantageous for the sheets to be coated with a rolling oil, which may include mineral substances, grease substances and process materials. However, before brazing material is applied to the structure produced from the sheet metal layers, such a rolling oil must be at least partially removed, which can be done by a heat treatment. It is especially practical, though, if such a thermal treatment can already be done on the honeycomb body, which is in its completely manufactured form and has its jacket tube. In other words, the sheet-metal structures provided with an oil film must first be inserted into a suitable jacket tube. Since the regions between the jacket tube and the honeycomb body structure that are to be brazed can no longer be provided with brazing material later, the desired subregions in the interior of the jacket tube must already have brazing material applied to them by that time. If that is to be done in a manner known per se by means of an adhesive material and brazing powder, then the brazing powder must continue to stick in the desired regions even during and after a heat treatment. Similar problems also arise with other honeycomb structures, in which certain parts must already have brazing material applied to them prior to the assembly, while other parts must only have that done later.

SUMMARY OF THE INVENTION

It is accordingly an object of the invention to provide a method for applying brazing material to a metal structure, particularly subregions of a honeycomb body, which overcomes the hereinafore-mentioned disadvantages of the heretofore-known methods of this general type and which enables the purposeful, thermally stable application of brazing material to subregions of a metal structure without the applied brazing material falling out again in the later heat treatment or other handling steps.

With the foregoing and other objects in view there is provided, in accordance with the invention, a method for applying brazing material to a metal structure, which comprises applying a sticky or adhesive material maintaining adhesiveness up to temperatures of at least 180° C. and preferably above 200° C., to at least a subregion of a metal structure, then applying brazing powder continuing to adhere or stick to the sticky material, and heat treating the structure, in particular by heat-degreasing structural parts that do not have or do not yet have brazing material applied to them, after the application of the brazing powder but before an actual brazing process, without the brazing powder falling out during the heat treatment and during ensuing handling steps.

The term "heat-treatment" is defined in that the temperature of the component is raised to a point below the melting point of the brazing powder. The term "brazing process" is defined as conventional brazing, in which the powder is melted, i.e. subjected to a phase change. The heat-treating step defined herein is not a part of the brazing or soldering process.

While it was heretofore not possible to apply brazing material to more-complex structures in two or more operating steps in a practical way and to perform even more-complex operating steps with a heat treatment after a first brazing material application, the present invention affords this kind of possibility. As a result, different types of brazing compounds in a metal structure can be employed by various brazing material application techniques, with different brazing materials, successively with high quality. In particular, it is possible for structures still provided with a rolling oil to be thermally degreased after a honeycomb body has been assembled, even if in other regions brazing material is still applied. This was previously not possible, which meant that major disadvantages from the use of already degreased sheets had to be tolerated in constructing the structures.

In accordance with still another mode of the invention, there is provided a method which comprises forming part of a metal honeycomb body, in particular a catalyst carrier body or a heat exchanger, with the metal structure.

In accordance with still a further mode of the invention, there is provided a method which comprises forming a jacket tube of a honeycomb body with the metal structure, the honeycomb body containing a number of sheet-metal layers, at least some of which are structured. The invention can be especially advantageously employed for joining the jacket tube of a catalyst carrier body to the remaining honeycomb body.

In accordance with another mode of the invention, there is provided a method which comprises applying a sticky material and then brazing powder to at least one striplike region extending approximately along the inner periphery on the inner surface of the jacket tube.

In accordance with a further mode of the invention, there is provided a method which comprises applying the sticky material, for instance, with a felted roller, an open-pored rubber device, or a spongelike device, and as a result this kind of process can also be automated easily.

In accordance with an added mode of the invention, there is provided a method which comprises applying the sticky material in striplike regions being approximately 15 mm to 25 mm wide, and preferably approximately 20 mm wide.

In accordance with an additional mode of the invention, there is provided a method which comprises applying brazing material to at least three striplike regions in honeycomb bodies or jacket tubes having an axial length of more than 90 mm and doing so in two such regions, or in one such region, with shorter jacket tubes. This is done in order to provide durability and to control problems of expansion.

In accordance with yet another mode of the invention, there is provided a method which comprises placing the striplike regions at a distance from the end surfaces of the jacket tube. This is done because on one hand the honeycomb structures inserted into such a jacket tube are somewhat shorter than the jacket tube itself in many applications, while on the other hand a connection between the jacket tube and the honeycomb structure is not necessarily supposed to be provided at the end surfaces.

In accordance with yet a further mode of the invention, there is provided a method which comprises drying the sticky material prior to the actual heat treatment to remove readily volatile components, if the sticky material is a solution. Upon later rapid heating, this averts bubble formation and therefore the detachment of brazing powder.

In accordance with yet an added mode of the invention, there is provided a method which comprises using polyvinyl methyl ether as the sticky material.

In accordance with yet an additional mode of the invention, there is provided a method which comprises using an approximately 2 to 6% aqueous solution and preferably an approximately 4% solution as the sticky material, for environmental protection reasons.

In accordance with again another mode of the invention, there is provided a method which comprises using brazing powder with particle sizes of approximately 50μ to 140μ, and preferably approximately 63μ to 125μ, at least for the application on catalyst carrier bodies as described. In order to braze the fine honeycomb structure itself, brazing materials having a considerable proportion of even smaller particles will generally be needed, and such brazing powder mixtures gradually become depleted of small brazing material particles over time. Precisely the remaining composition of particle sizes is especially suitable for applying brazing material to the inner surface of jacket tubes, which makes the entire production process highly economical.

In accordance with again a further mode of the invention, there is provided a method which comprises thrusting structured sheet-metal layers into the jacket tube or inserting them in some other way and then carrying out the heat treatment, after the brazing powder has been applied.

In accordance with again an added mode of the invention, there is provided a method which comprises applying the brazing powder itself in a fluidized bed, in which the parts of the structure to which brazing material is to be applied are immersed. Blowing-in brazing powder or comparable methods, can also be employed.

In accordance with a concomitant mode of the invention, there is provided a method which comprises applying a nickel-based brazing material, for instance, in a preferably monoparticulate film, with a resultant application weight of approximately 0.03 g to 0.04 g per square centimeter. The desired metering of brazing powder in very small doses and very precisely in the desired regions can be adhered to in this way.

Other features which are considered as characteristic for the invention are set forth in the appended claims.

Although the invention is illustrated and described herein as embodied in a method for applying brazing material to a metal structure, particularly subregions of a honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
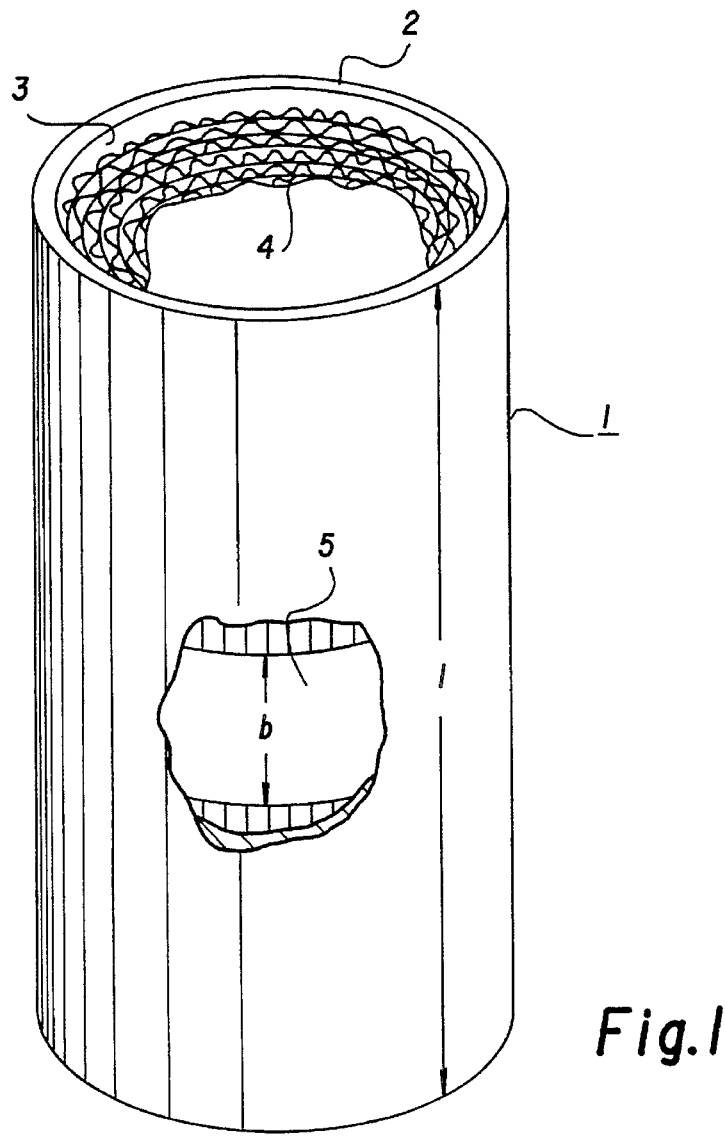
FIG. 1 is a diagrammatic, partly broken-away, perspective view of a catalyst carrier body.
Figure 2:
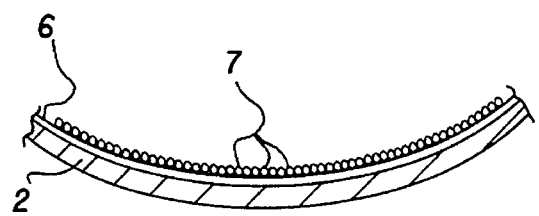
FIG. 2 is a fragmentary, cross-sectional view of a jacket tube of such a body, with brazing material applied to the tube.

Referring now to the figures of the drawing in detail and first, particularly, to FIG. 1 thereof, there is seen a catalyst carrier body 1 with a jacket tube 2, having an inner surface 3 which has brazing material applied to it in a region 5 with a width b, according to the method of the invention. The jacket tube has an axial length l of more than 90 mm. After the application of brazing material, an actual honeycomb body 4 including a number of structured sheet-metal layers can be inserted. As FIG. 2 shows, in the brazing material application process, the jacket tube 2 is provided with a sticky material 6, on which a film of brazing powder 7 continues to stick. After the honeycomb body 1 has been assembled, it can be heat-treated, for instance degreased, without loss of the already-applied brazing powder at temperatures of 180° C. or higher, and as a result an ensuing application of brazing material, for instance to the end surfaces of the honeycomb structure 4, can be performed by some other brazing material application method and/or with some other brazing material. The use of structured sheet metal layers that have not yet been degreased or specially lubricated can simplify and speed up the overall production process, and different brazing materials and brazing material application methods may be employed for the various joining tasks that arise.

I claim:

1. A method for applying brazing material to a metal structure, which comprises:

applying a sticky material maintaining adhesiveness up to temperatures of at least 180° C., to at least a subregion of a metal structure, subsequently applying brazing powder and permanently adhering the brazing powder to the sticky material, and heat treating the structure after the application of the brazing powder but prior to brazing, without the brazing powder falling out during the heat treating step and during ensuing handling steps.

2. The method according to claim 1, which comprises maintaining the adhesiveness of the sticky material at temperatures above 200° C.

3. The method according to claim 1, which comprises carrying out the heat treatment of the structure, by heat-degreasing structural parts that do not have brazing material applied to them.

4. The method according to claim 1, which comprises carrying out the heat treatment of the structure, by heat-degreasing structural parts that do not yet have brazing material applied to them.

5. The method according to claim 1, which comprises forming part of a metal honeycomb body with the metal structure.

6. The method according to claim 1, which comprises forming part of a catalyst carrier body with the metal structure.

7. The method according to claim 1, which comprises forming part of a heat exchanger with the metal structure.

8. The method according to claim 1, which comprises forming a jacket tube of a honeycomb body with the metal structure, the honeycomb body containing a number of sheet-metal layers, at least some of which are structured.

9. The method according to claim 8, which comprises applying the sticky material and the brazing powder on an inner surface of the jacket tube in at least one striplike region extending approximately along an inner periphery.

10. The method according to claim 9, which comprises applying the sticky material with an applicator selected from the group consisting of a felted roller, an open-pore rubber device and a sponge-like device.

11. The method according to claim 9, which comprises applying the sticky material and the brazing powder in the at least one striplike region with a width of from 15 to 25 mm.

12. The method according to claim 9, which comprises applying the sticky material and the brazing powder in the at least one striplike region with a width of approximately 20 mm.

13. The method according to claim 9, which comprises applying the sticky material and the brazing powder in at least three striplike regions in a jacket tube with an axial length of more than 90 mm.

14. The method according to claim 9, which comprises applying the sticky material and the brazing powder in the at least one striplike region at a distance from end surfaces of the jacket tube.

15. The method according to claim 1, which comprises drying the sticky material prior to the heat treating step, to remove readily volatile components.

16. The method according to claim 1, which comprises applying polyvinyl methyl ether as the sticky material.

17. The method according to claim 16, which comprises applying the polyvinyl methyl ether in an aqueous solution of from 2 to 6%.

18. The method according to claim 16, which comprises applying the polyvinyl methyl ether in an aqueous solution of approximately 4%.

19. The method according to claim 1, which comprises selecting a particle size of particles in the brazing powder of approximately 50 to 130µ.

20. The method according to claim 1, which comprises selecting a particle size of particles in the brazing powder of approximately 63 to 125µ.

21. The method according to claim 8, which comprises thrusting the structured sheet-metal layers into the jacket tube after the application of the brazing powder, and then carrying out the heat treatment.

22. The method according to claim 1, which comprises applying the brazing material in a fluidized bed in which the structure is at least partly immersed.

23. The method according to claim 1, which comprises applying the brazing powder in a thin film.

24. The method according to claim 1, which comprises applying the brazing powder in a thin monoparticulate film.

25. The method according to claim 1, which comprises applying the brazing powder in a thin film with a weight of approximately 0.03 to 0.04 g/cm² for a nickel-based brazing material.

* * * * *